(12) United States Patent
Yamada

(10) Patent No.: US 7,965,282 B2
(45) Date of Patent: *Jun. 21, 2011

(54) OPERATION DEVICE FOR VEHICLE

(75) Inventor: Hajime Yamada, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 98 days.

This patent is subject to a terminal disclaimer.

(21) Appl. No.: 11/989,240

(22) PCT Filed: Jul. 25, 2006

(86) PCT No.: PCT/JP2006/314646
§ 371 (c)(1),
(2), (4) Date: Mar. 20, 2009

(87) PCT Pub. No.: WO2007/013441
PCT Pub. Date: Feb. 1, 2007

(65) Prior Publication Data
US 2009/0200149 A1 Aug. 13, 2009

(30) Foreign Application Priority Data

Jul. 29, 2005 (JP) ................................ 2005-220641

(51) Int. Cl.
*G09G 5/00* (2006.01)
(52) U.S. Cl. .... 345/184; 345/156; 345/161; 74/471 XY; 463/38; 200/5 R; 200/6 R; 200/6 A; 701/1; 701/36; 361/679.1; 361/679.18; 700/85
(58) Field of Classification Search .......... 345/156–158, 345/164–169, 184, 161, 162; 200/5 A, 5 R, 200/6 A, 6 R; 701/1, 36; 307/9.1; 463/37, 463/38; 74/471 XY; D14/412–417; 715/345; 700/85; 361/679.1, 679.18
See application file for complete search history.

(56) References Cited

U.S. PATENT DOCUMENTS

| | | | | |
|---|---|---|---|---|
| 4,975,547 | A * | 12/1990 | Nakayama et al. | 200/5 R |
| 5,952,628 | A | 9/1999 | Sato et al. | |
| 6,005,299 | A * | 12/1999 | Hengst | 307/10.1 |
| 6,410,866 | B1 * | 6/2002 | Klein et al. | 200/5 R |

(Continued)

FOREIGN PATENT DOCUMENTS

DE 41 20 975 A1 1/1993

(Continued)

*Primary Examiner* — Lun-Yi Lao
(74) *Attorney, Agent, or Firm* — Birch Stewart Kolasch & Birch, LLP

(57) ABSTRACT

An operation device for a vehicle is provided that enables switching over of a plurality of operation menu display screens and switching over of a plurality of function display screens for in-vehicle equipment displayed on a monitor by tilting of an operating knob (30) in eight directions, pivoting of the operating knob (30) around its axis, and operation of a main switch (31) and a sub switch (32) provided on the operating knob (30). In this process, since the operating knob (30) is not pivoted around its axis without limit but it is restricted so that pivoting is possible only in a predetermined angle range, it is not necessary to change the grip on the operating knob (30) when pivoting the operating knob (30), the burden on the wrist is lessened, and the operability is improved. Moreover, since the main switch (31) and the sub switch (32) are provided on the operating knob (20), they can be operated without detaching the hand from the operating knob (30), thus further improving the operability.

15 Claims, 16 Drawing Sheets

U.S. PATENT DOCUMENTS

| | | | |
|---|---|---|---|
| 6,441,753 B1* | 8/2002 | Montgomery | 341/34 |
| 6,636,200 B2* | 10/2003 | Kataoka et al. | 345/161 |
| 2001/0000125 A1* | 4/2001 | Zimmerman et al. | 345/161 |
| 2002/0021282 A1* | 2/2002 | Masudaya | 345/156 |
| 2003/0016208 A1* | 1/2003 | Wiesenauer | 345/157 |
| 2003/0234764 A1* | 12/2003 | Noguchi et al. | 345/156 |
| 2004/0046751 A1* | 3/2004 | Heimermann et al. | 345/184 |
| 2004/0060807 A1* | 4/2004 | Nishimoto et al. | 200/553 |
| 2004/0164963 A1 | 8/2004 | Ono et al. | |
| 2004/0257339 A1* | 12/2004 | Takahashi | 345/156 |
| 2005/0077156 A1* | 4/2005 | Ushimaru et al. | 200/6 A |
| 2005/0083297 A1* | 4/2005 | Duncan | 345/156 |
| 2006/0082545 A1* | 4/2006 | Choquet et al. | 345/156 |
| 2006/0132469 A1* | 6/2006 | Lai et al. | 345/184 |
| 2006/0243568 A1* | 11/2006 | Badarneh | 200/6 A |

FOREIGN PATENT DOCUMENTS

| | | |
|---|---|---|
| DE | 100 03 610 A1 | 8/2001 |
| DE | 10 2004 041 690 A1 | 3/2005 |
| EP | 0 893 750 A1 | 1/1999 |
| EP | 1 271 587 A2 | 1/2003 |
| JP | 10-50178 A | 2/1998 |
| JP | 10-241501 A | 9/1998 |
| JP | 11-67017 A | 3/1999 |
| JP | 2000-149719 A | 5/2000 |
| JP | 2001-291456 A | 10/2001 |
| JP | 2002-062944 A | 2/2002 |
| JP | 2003-220893 A | 8/2003 |
| JP | 2004-299539 A | 10/2004 |
| JP | 2005-1587 A | 1/2005 |

* cited by examiner

OPERATION DEVICE FOR VEHICLE

TECHNICAL FIELD

The present invention relates to an operation device for a vehicle that includes a monitor for displaying information related to in-vehicle equipment installed in the vehicle, and an operating knob for outputting an operation command signal to the in-vehicle equipment based on information displayed on the monitor.

BACKGROUND ART

An arrangement in which, in order to operate in-vehicle equipment such as an audio system or an air conditioning system of a vehicle, a tiltable and rotatable operating knob is provided on a console box, and operating this operating knob carries out switching over of a plurality of in-vehicle equipment operation menu display screens displayed on a monitor and switching over of a plurality of function display screens, is known from Patent Publication 1 below.
Patent Publication 1: Japanese Patent Application Laid-open No. 2003-220893

DISCLOSURE OF INVENTION

Problems to be Solved by the Invention

However, in the arrangement disclosed in Patent Publication 1 above, since the operating knob rotates without limit beyond 360°, when the rotational angle of the operating knob is large, it is necessary for the occupant to change the grip on the operating knob, thus making the operability poor. Furthermore, in the arrangement disclosed in Patent Publication 1 above, a mode return switch is provided on the console box separately from the operating knob, it is necessary to detach the hand from the operating knob to operate the mode return switch, and there is also the problem that the operability is poor.

The present invention has been accomplished in the light of the above circumstances, and it is an object thereof to enhance the operability of an operating knob for switching over a plurality of operation menu display screens and function display screens displayed on a monitor of in-vehicle equipment.
Means for Solving the Problems In order to attain the above object, according to a first aspect of the present invention, there is proposed an operation device for a vehicle comprising a monitor for displaying information related to in-vehicle equipment installed in the vehicle, and an operating knob for outputting an operation command signal to the in-vehicle equipment based on information displayed on the monitor, characterized in that switching over of a plurality of operation menu display screens and switching over of a plurality of function display screens for the in-vehicle equipment displayed on the monitor are carried out by tilting of the operating knob in a plurality of directions, pivoting of the operating knob around an axis thereof in a predetermined angle range, and operation of a main switch provided on a front part of the operating knob.

Further, according to a second aspect of the present invention, in addition to the first aspect, there is proposed the operation device for a vehicle, wherein a display screen displayed on the monitor is returned to a higher level display screen by operation of sub switches provided on opposite side parts on the left and right of the operating knob.

Further, according to a third aspect of the present invention, in addition to the first or second aspect, there is proposed the operation device for a vehicle, wherein the operating knob comprises a first variable load mechanism for giving a restraining feel to operation by changing an operating load according to a tilt angle of the operating knob.

Further, according to a fourth aspect of the present invention, in addition to the third aspect, there is proposed the operation device for a vehicle, wherein the operating knob is held at a neutral position in the tilt direction when the operating knob is not in operation.

Further, according to a fifth aspect of the present invention, in addition to the third aspect, there is proposed the operation device for a vehicle, wherein the first variable load mechanism of the operating knob has guide means for guiding the operating knob in a proper tilt direction.

Further, according to a sixth aspect of the present invention, in addition to the first or second aspect, there is proposed the operation device for a vehicle, wherein the operating knob comprises a second variable load mechanism for giving a restraining feel to operation by changing an operating load according to a pivot angle of the operating knob.

Further, according to a seventh aspect of the present invention, in addition to the sixth aspect, there is proposed the operation device for a vehicle, wherein the second variable load mechanism has click stop means for stopping the operating knob at a plurality of positions in a pivoting direction.

A guide groove 18$b$, a sliding member 40, and a spring 41 of embodiments correspond to the first variable load mechanism of the present invention, and a click plate 42, a ball 45, and a spring 46 of the embodiments correspond to the second variable load mechanism of the present invention.

EFFECTS OF THE INVENTION

In accordance with the first aspect of the present invention, tilting of the operating knob in a plurality of directions, pivoting of the operating knob around its axis in a predetermined angle range, and operation of the main switch provided on a front part of the operating knob enable the plurality of operation menu display screens and the plurality of function display screens for the in-vehicle equipment displayed on the monitor to be switched over. In this process, since the operating knob is not pivoted around its axis without limit but it is restricted so that pivoting is possible only in the predetermined angle range, it is not necessary to change the grip on the operating knob when pivoting the operating knob, the burden on the wrist is lessened, and the operability is improved. Moreover, since the main switch is provided on the front part of the operating knob, the main switch can be operated without detaching the hand from the operating knob, thus further improving the operability.

In accordance with the second aspect of the present invention, when the sub switches provided on opposite side parts on the left and right of the operating knob are operated, since the display screen displayed on the monitor is returned to a higher level display screen, it is easy to carry out a return operation to a higher level display screen. Moreover, since the sub switches are provided on opposite side parts on the left and right of the operating knob, the sub switches can be operated easily regardless of the positional relationship between the occupant and the operating knob.

In accordance with the third aspect of the present invention, since the first variable load mechanism provided on the operating knob changes the operating load according to the tilt angle of the operating knob, a restraining feel can be given to operation of the operating knob, thus enhancing the operational feel.

In accordance with the fourth aspect of the present invention, since the operating knob is held at the neutral position in the tilt direction when it is not in operation, it is unnecessary for the occupant to take the trouble to return the operating knob to the neutral position, thus enhancing the operability.

In accordance with the fifth aspect of the present invention, since the first variable load mechanism has guide means for guiding the operating knob in the proper tilt direction, it is possible to prevent the operating knob from tilting in a direction other than the proper tilt direction.

In accordance with the sixth aspect of the present invention, since the second variable load mechanism provided on the operating knob changes the operating load according to the pivoting angle of the operating knob, a restraining feel can be given to operation of the operating knob, thus enhancing the operational feel.

In accordance with the seventh aspect of the present invention, since the second variable load mechanism has click stop means for stopping the operating knob at a plurality of positions in the pivoting direction, it is possible to stop the operating knob with restraint at a plurality of positions in the pivoting direction, thus improving the operational feel and preventing an erroneous operation.

EXPLANATION OF REFERENCE NUMERALS AND SYMBOLS

18b Guide groove (first variable load mechanism)
30 Operating knob
31 Main switch
32 Sub switch
40 Sliding member (first variable load mechanism)
41 Spring (first variable load mechanism)
42 Click plate (second variable load mechanism)
45 Ball (second variable load mechanism)
46 Spring (second variable load mechanism)

BEST MODE FOR CARRYING OUT THE INVENTION

Modes for carrying out the present invention are explained below by reference to embodiments of the present invention shown in the attached drawings.

EMBODIMENT 1

FIG. 1 to FIG. 12 show a first embodiment of the present invention.

Figure 1:
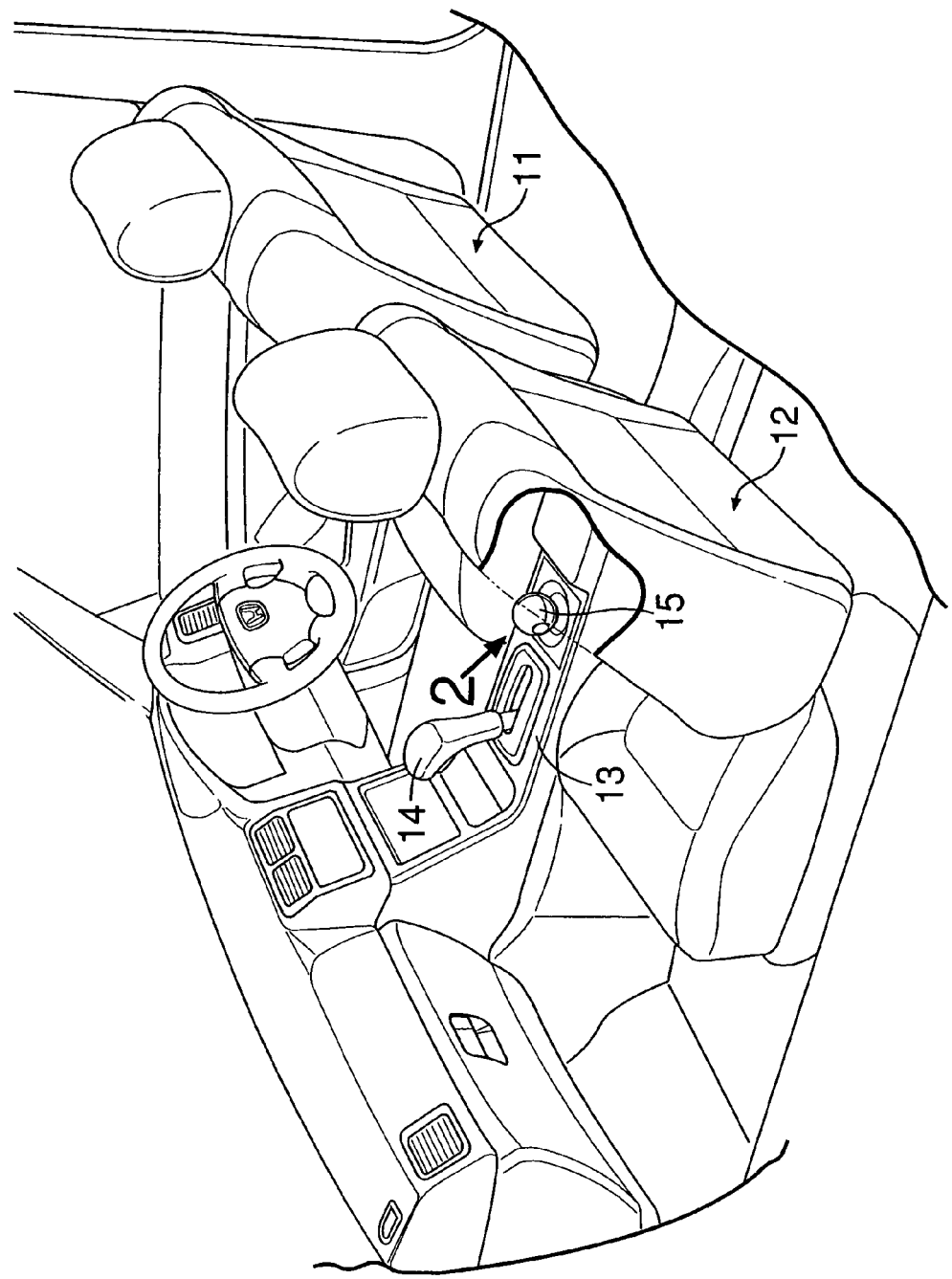
FIG. 1 is a perspective view of a vehicle compartment front part of a motor vehicle (first embodiment).
Figure 2:
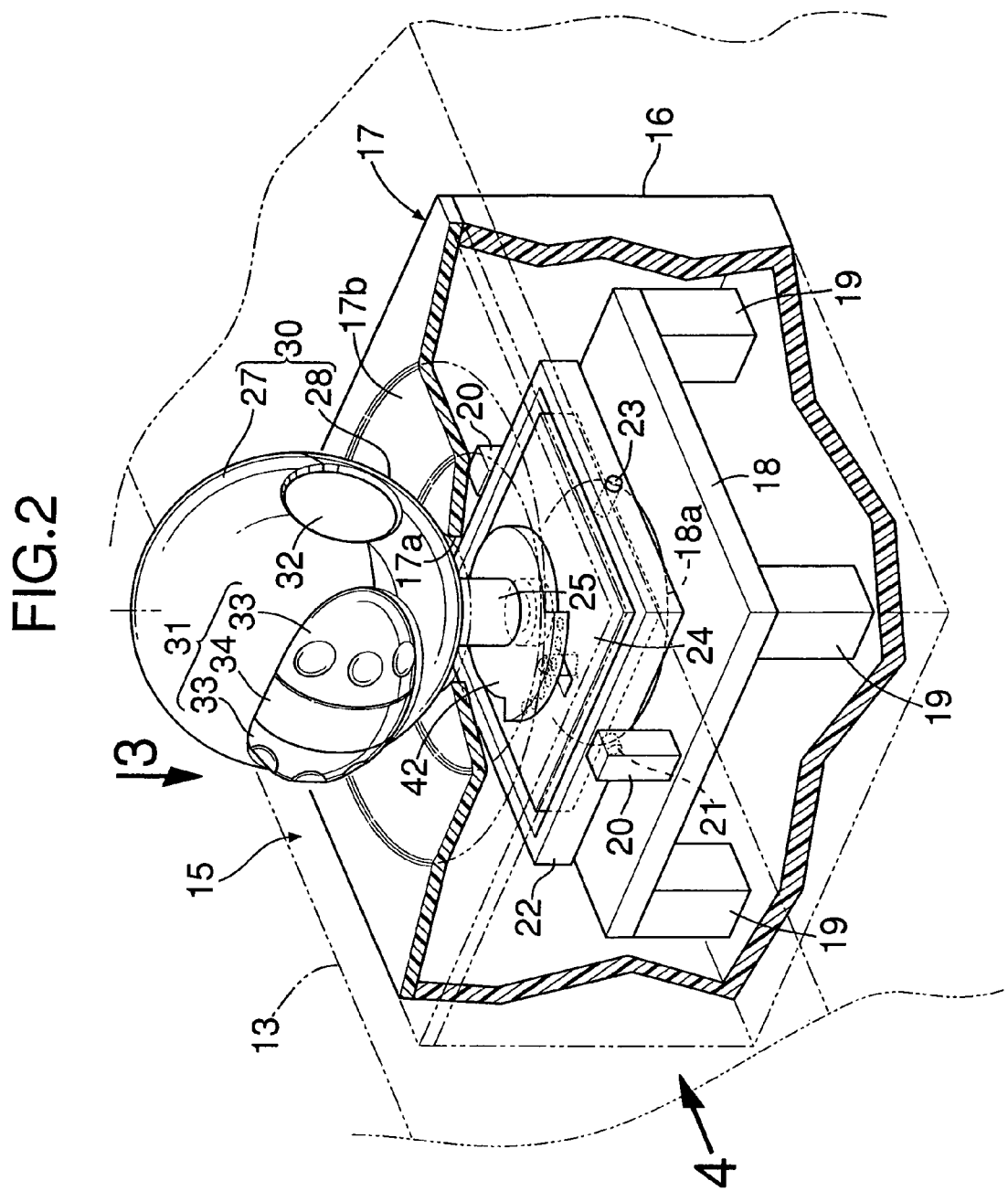
FIG. 2 is an enlarged view from the direction of arrow 2 in FIG. 1 (first embodiment).
Figure 3:
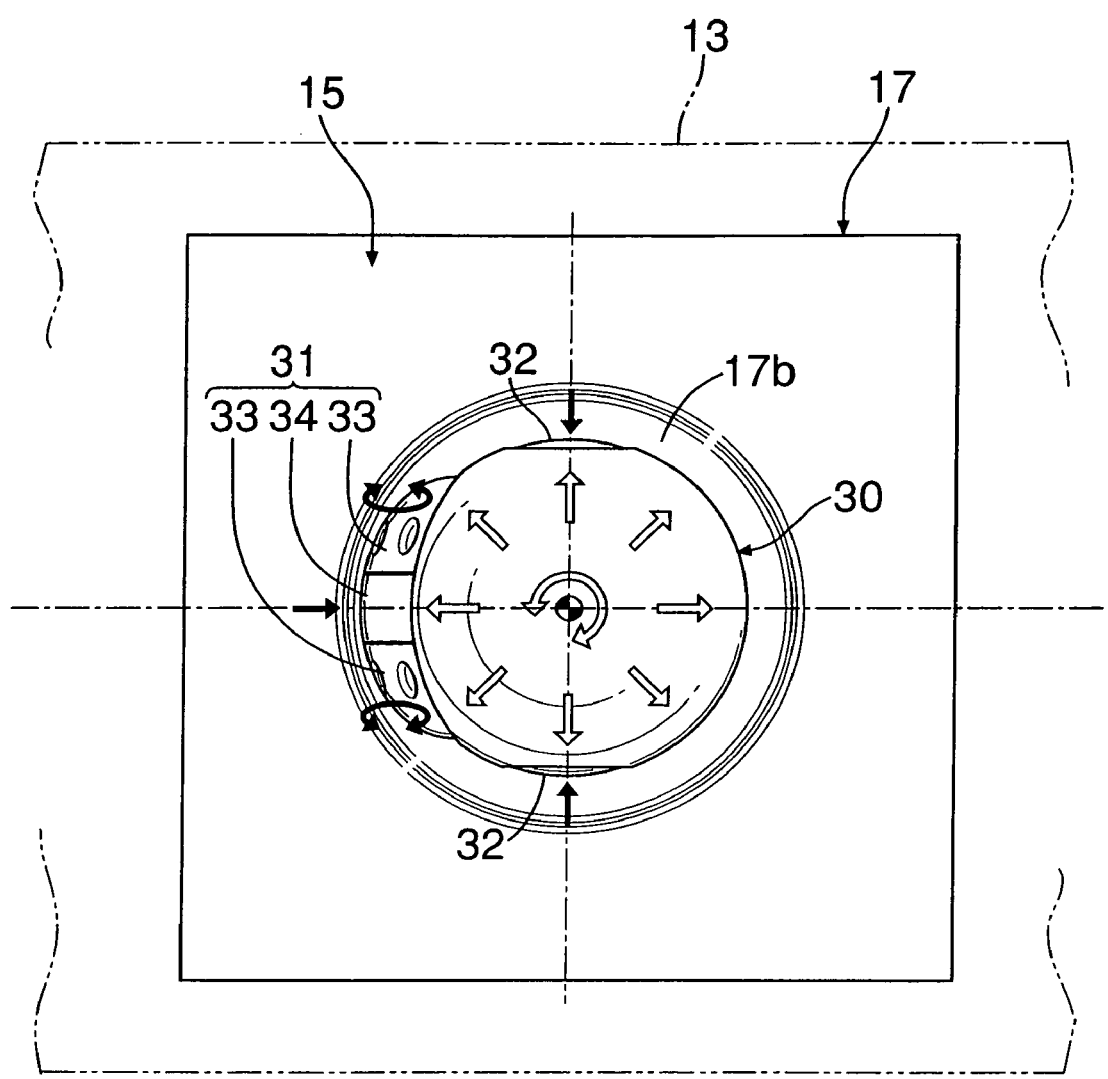
FIG. 3 is a view from the direction of arrow 3 in FIG. 2 (first embodiment).
Figure 4:
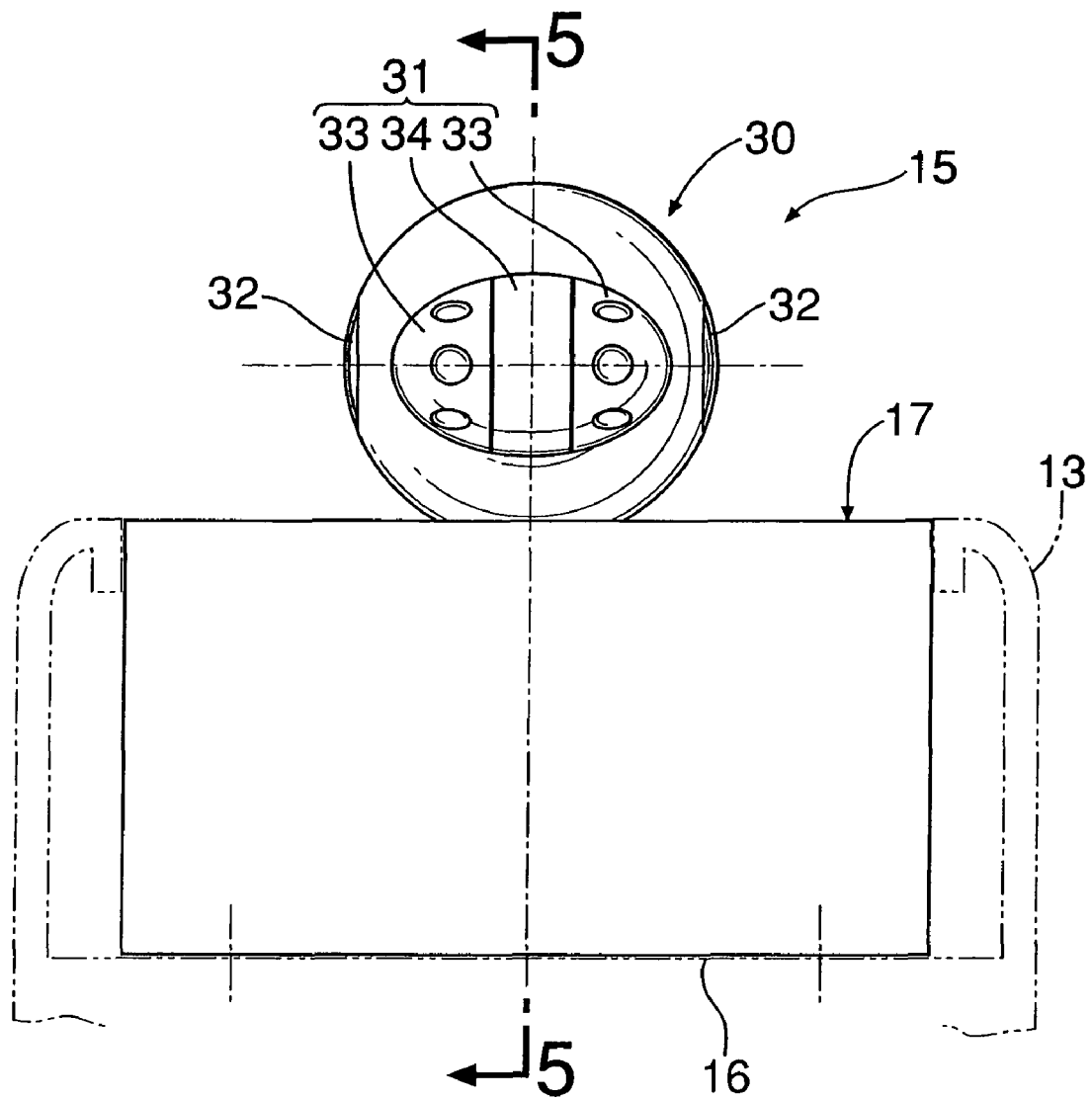
FIG. 4 is a view from the direction of arrow 4 in FIG. 2 (first embodiment).

As shown in FIG. 1, a shift lever 14 is disposed on an upper face of a center console 13 extending in the fore-and-aft direction between a driver's seat 11 and a passenger seat 12 of a passenger vehicle, and an interface device 15 is disposed to the rear of the shift lever 14.

As shown in FIG. 1 to FIG. 9, the interface device 15 includes a box-shaped casing 16 and a cover 17 covering an upper face of the casing 16, and a base plate 18 is supported within the casing 16 via four support legs 19. A frame-shaped outer gimbal 22 is supported, via pins 21 and 21, so that it can swing in the left-and-right direction between a pair of front and rear support posts 20 and 20 uprightly provided on an upper face of the base plate 18, and a plate-shaped inner gimbal 24 is supported, via a pair of left and right pins 23 and 23, so that it can swing in the fore-and-aft direction within the outer gimbal 22. The inner gimbal 24 can therefore swing in fore-and-aft and left-and-right directions relative to the base plate 18.

An upper support shaft 24a and a lower support shaft 24b project vertically from the center of the inner gimbal 24, and the inner periphery of the lower end of a rotary shaft 25 is rotatably fitted around the outer periphery of the upper end of the upper support shaft 24a and retained by a bolt 26. The upper half of the rotary shaft 25 runs through an opening 17a formed in the cover 17 and projects upward. An upper knob half 27 and a lower knob half 28 are fitted together so as to sandwich from above and below a projection 25a projecting rearward from the upper end of the rotary shaft 25 and are integrally tightened together via bolts 29 and 29. The upper knob half 27 and the lower knob half 28 form in cooperation with each other a spherical operating knob 30, and since this operating knob 30 is connected to the base plate 18 via the rotary shaft 25, it can tilt in fore-and-aft and left-and-right directions together with the base plate 18.

In this embodiment, the operating knob 30 has a diameter of 80 mm, and employing this dimension enables the operating knob 30 to be easily gripped by a person's hand. Furthermore, the operating knob 30 includes a palm rest portion 30a on the rear side and a finger rest portion 30b on the front side, and the border between the palm rest portion 30a and the finger rest portion 30b is at point P in FIG. 5. This point P is a portion corresponding to base parts of an index finger and a middle finger when the operating knob 30 is gripped naturally.

A main switch 31 is provided on the front face of the operating knob 30, and a pair of sub switches 32 and 32 are provided on opposite side faces on the left and right of the operating knob 30. The main switch 31 is formed from a scroll switch 33 and an execution switch 34, the scroll switch 33, which is divided into left and right portions, is capable of rotating around a support shaft 35 supported at the front end of the rotary shaft 25, and the execution switch 34, which is sandwiched by the divided scroll switch 33, is capable of swinging rearward around a support shaft 36 disposed above the support shaft 35 of the scroll switch 33. The rotational angle of the scroll switch 33 is detected by a rotary encoder 37 provided between the support shaft 35 and the rotary shaft 25, and operation of the execution switch 34 is detected by a switching element 38 provided on the rotary shaft 25. The left and right sub switches 32 and 32 mainly exhibit the function of a cancel switch, and operation thereof is detected by switching elements 39 and 39 provided on the rotary shaft 25.

A partially spherical recess 18*a* is formed in a middle part of the base plate 18, and a star-shaped guide groove 18*b* extending radially in eight directions is formed in the recess 18*a*. A sliding member 40 is housed in a hollow portion 24*c* formed in the interior of the lower support shaft 24*b* of the inner gimbal 24, and the sliding member 40 is urged downward by means of a spring 41 so that a hemispherical sliding portion 40*a* formed at the lower end of the sliding member 40 abuts against the guide groove 18*b*.

Figure 9:
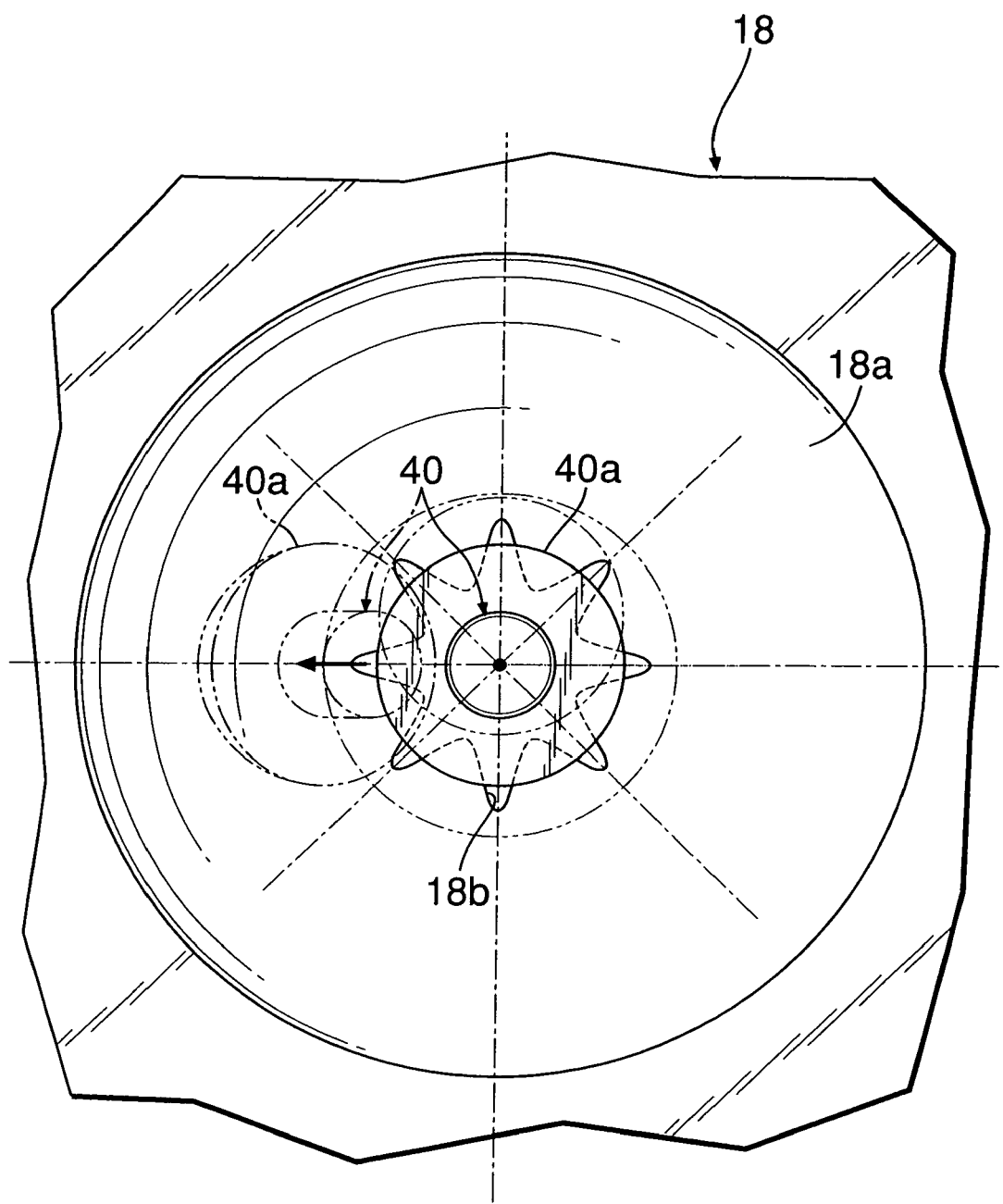
FIG. 9 is a sectional view along line 9-9 in FIG. 5 (first embodiment).
Figure 10:
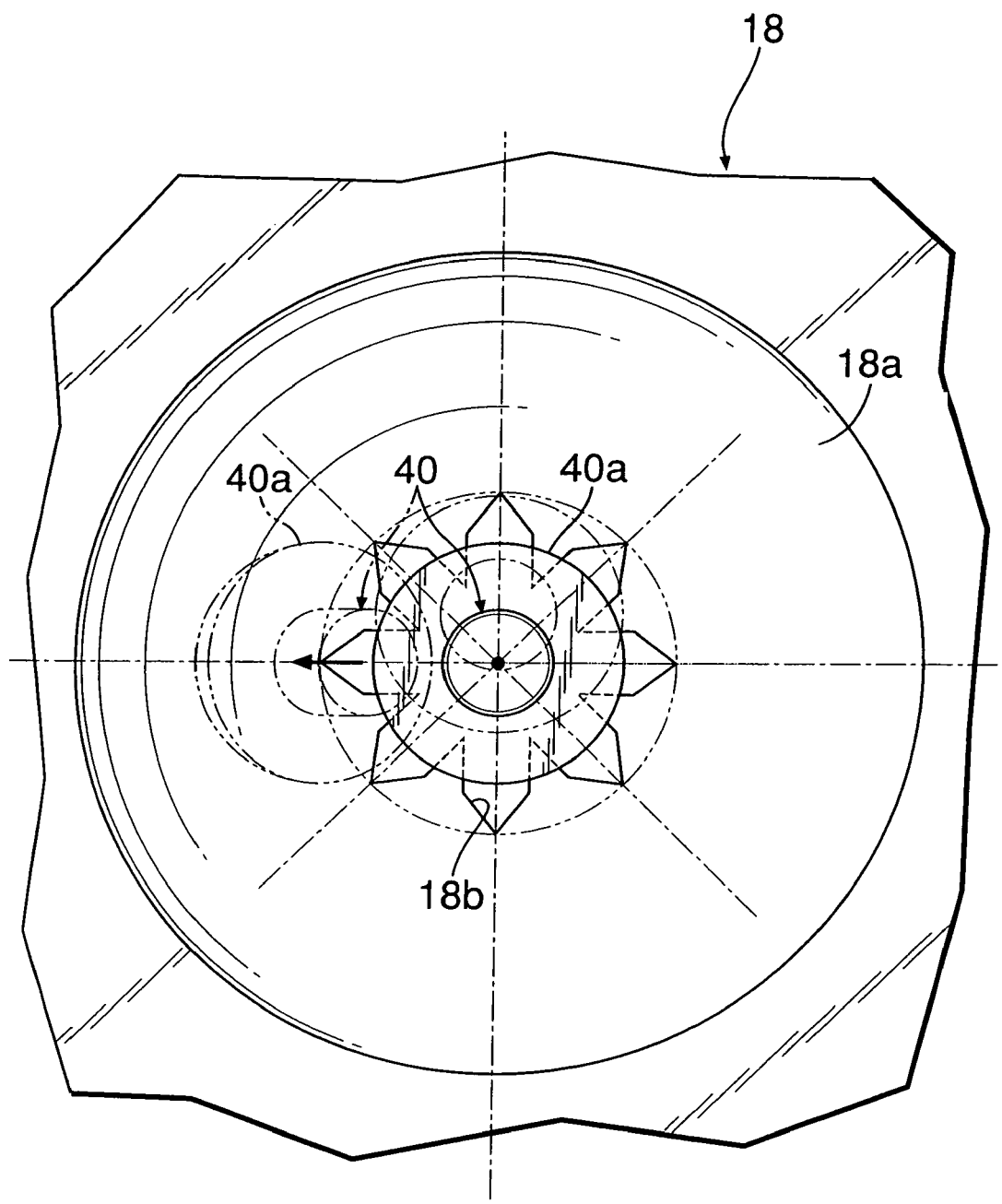
FIG. 10 is a view, corresponding to FIG. 9, showing a modified example of a guide groove (first embodiment).

The shape of each groove of the guide groove 18*b* is simply tapered from radially inside to outside in the first embodiment shown in FIG. 9, and in a modified example shown in FIG. 10 it first has a fixed width and is then tapered from radially inside to outside.

A disk-shaped click plate 42 is formed integrally with the lower end of the rotary shaft 25, seven click holes 42*a* are formed in the lower face of the click plate 42 on a circumference with the rotary shaft 25 as the center, and one click hole 42*b* is formed radially inside the seven click holes 42*a*. A middle section of a ball holder 44 is pivotably supported on the inner gimbal 24 via a support shaft 43, and a ball 45 housed within the ball holder 44 is urged by means of a spring 46 so that it can fit into any of the click holes 42*a* and 42*b*. A solenoid 47 supported on a lower face of the inner gimbal 24 is connected to the lower end of the ball holder 44 by means of a rod 48, and making the ball holder 44 swing around the support shaft 43 by making the solenoid 47 expand and contract enables the ball 45 to move between a radially outside position in which it fits into the click holes 42*a* and a radially inside position in which it fits into the click hole 42*b*. The rotational angle of the rotary shaft 25 relative to the inner gimbal 24 is detected by a rotary encoder 49.

The operation of the first embodiment having the above-mentioned arrangement is now explained.

The operating knob 30 is capable of tilting in eight directions, that is, forward, rearward, rightward, leftward, right-forward, left-forward, right-rearward, and left-rearward, these eight directions corresponding to the directions in which the guide groove 18*b* of the recess 18*a* of the base member 18 shown in FIG. 9 and FIG. 10 extends. That is, when the operating knob 30 tiltably supported via the outer gimbal 22 and the inner gimbal 24 is in a neutral position, the sliding portion 40*a* of the sliding member 40 made to project downward from the lower support shaft 24*b* integral with the operating knob 24 by the resilient force of the spring 41 engages with the center of the star-shaped guide groove 18*b* in a stable manner, thereby holding the operating knob 30 in the neutral position. Furthermore, when the operating knob 30 is released from the hand when in a tilted position, it is returned to the neutral position by return means (not illustrated).

From this state, tilting the operating knob 30 in one direction among the eight directions allows the sliding portion 40*a* of the sliding member 40 to be guided along the tapered guide groove 18*b* from radially inside to outside; as the groove width of the guide groove 18*b* decreases, the sliding member 40 is pushed into the hollow portion 24*c* of the lower support shaft 24*b* against the resilient force of the spring 41, and a predetermined load is produced in tilting the operating knob 30.

Figure 11:
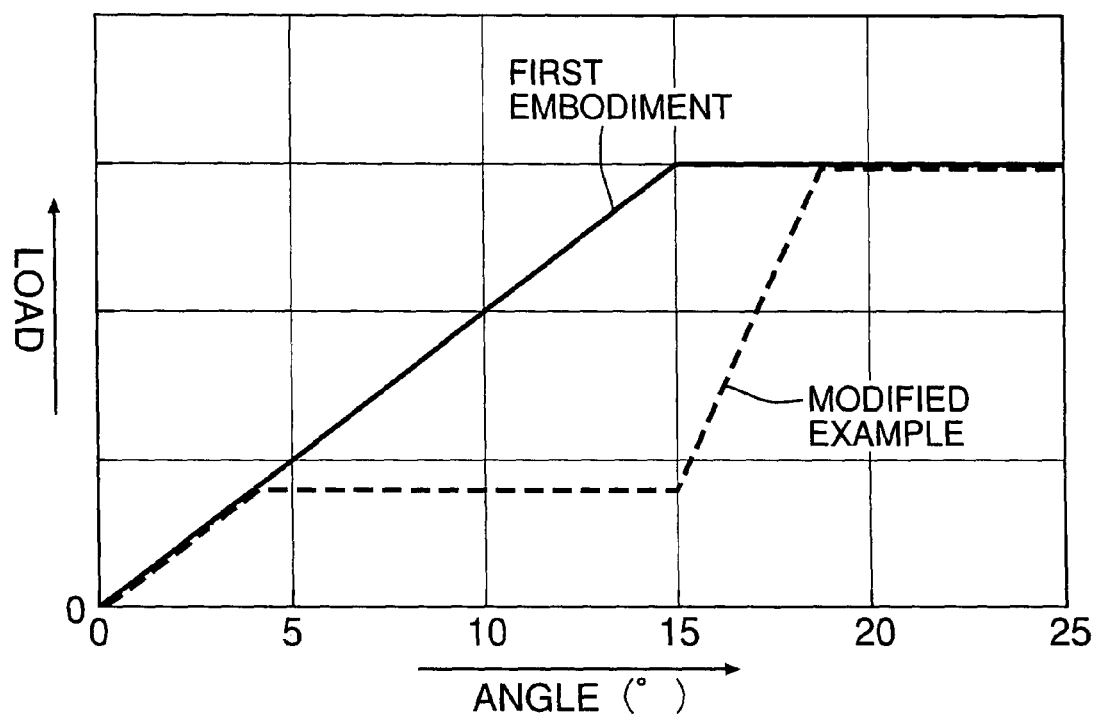
FIG. 11 is a graph showing the relationship between tilt angle and load of an operating knob (first embodiment).

The solid line in FIG. 11 corresponds to the guide groove 18*b* (first embodiment) in FIG. 9; as the tilt angle of the operating knob 30 increases the load increases linearly, and when the sliding portion 40*a* rides past the guide groove 18*b* the load attains a fixed value.

The broken line in FIG. 11 corresponds to the guide groove 18*b* in FIG. 10 (modified example of the first embodiment); the load increases linearly as the tilt angle of the operating knob 30 increases until the sliding portion 40*a* engages with the parallel portion of the guide groove 18*b*, the load is then held at a fixed value while the sliding portion 40*a* slides against the parallel portion of the guide groove 18*b*, the load increases linearly while the sliding portion 40*a* slides against the tapered portion of the guide groove 18*b*, and the load attains a fixed value when the sliding portion 40*a* rides past the guide groove 18*b*.

In this way, restraint is given to tilting of the operating knob 30 in accordance with the shape of the guide groove 18*b*, thus enhancing the operational feel, and even when the operating knob 30 is operated in a direction that deviates from the eight directions, the operating knob 30 can be guided in the correct direction by the effect of the guide groove 18*b*.

In this way, tilting the operating knob 30 in the eight directions allows contacts, which are not illustrated, to be closed, thus outputting a signal corresponding to the tilt direction to control means.

Furthermore, rotating the operating knob 30 left or right allows the rotary shaft 25, which is integral with the operating knob 30, to rotate relative to the upper support shaft 24*a*, and the click plate 42, which is integral with the rotary shaft 25, to rotate relative to the inner gimbal 24. When the solenoid 47 is expanded by the operation of a switch (not illustrated) and the ball holder 44 swings to a position in the clockwise direction in FIG. 5, the position of the ball 45 moves radially inward, and the ball 45 accordingly fits into the one click hole 42*b*, which is on the radially inner side of the click plate 42, thus stably holding the operating knob 30 in a neutral position in a pivoting direction. When the operating knob 30 is rotated in a left or right direction from this state, since a load occurs as the ball 45 is detached from the click hole 42*b* against the resilient force of the spring 46, restraint can be given to pivoting of the operating knob 30 from the neutral position.

Figure 5:
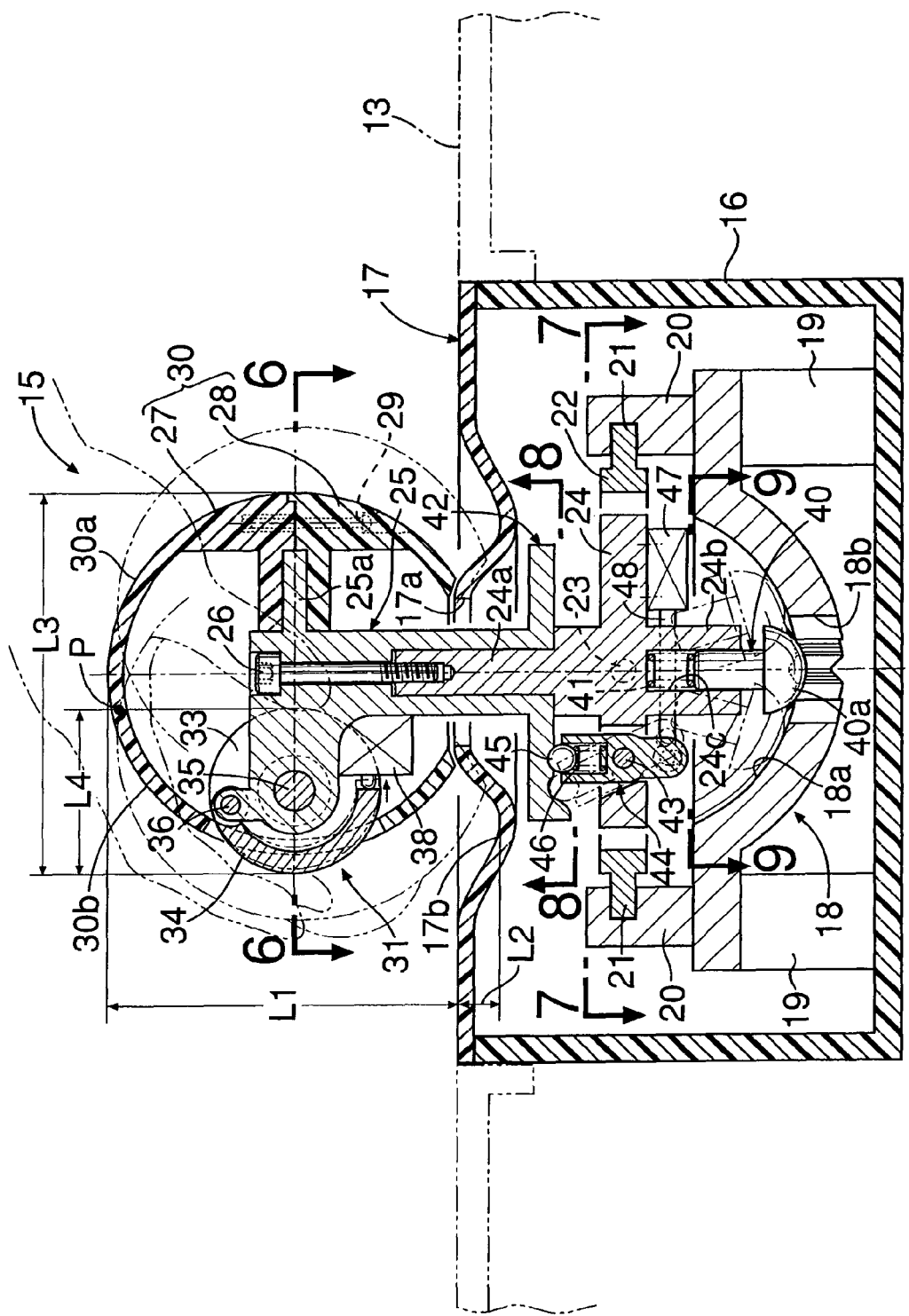
FIG. 5 is a sectional view along line 5-5 in FIG. 4 (first embodiment).
Figure 6:
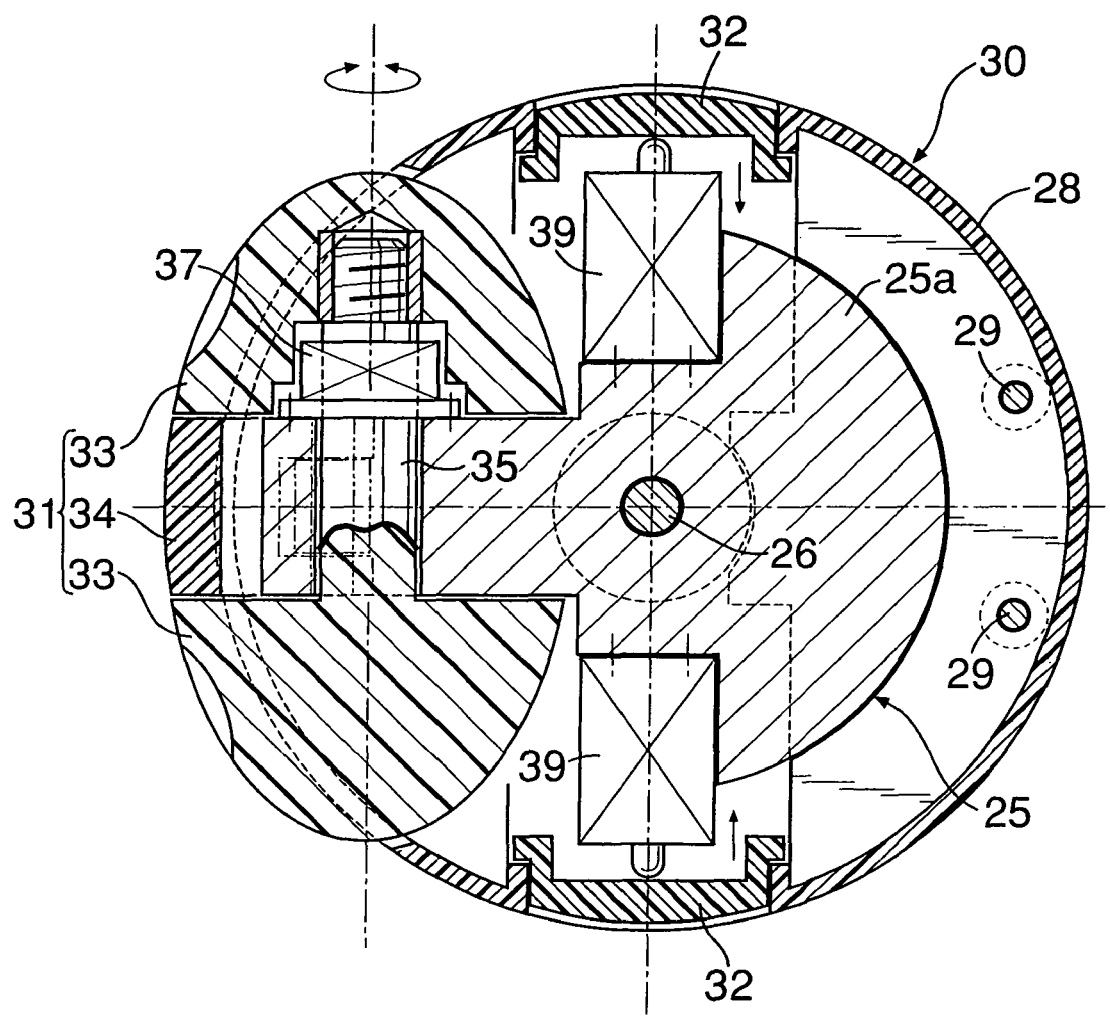
FIG. 6 is a sectional view along line 6-6 in FIG. 5 (first embodiment).
Figure 7:
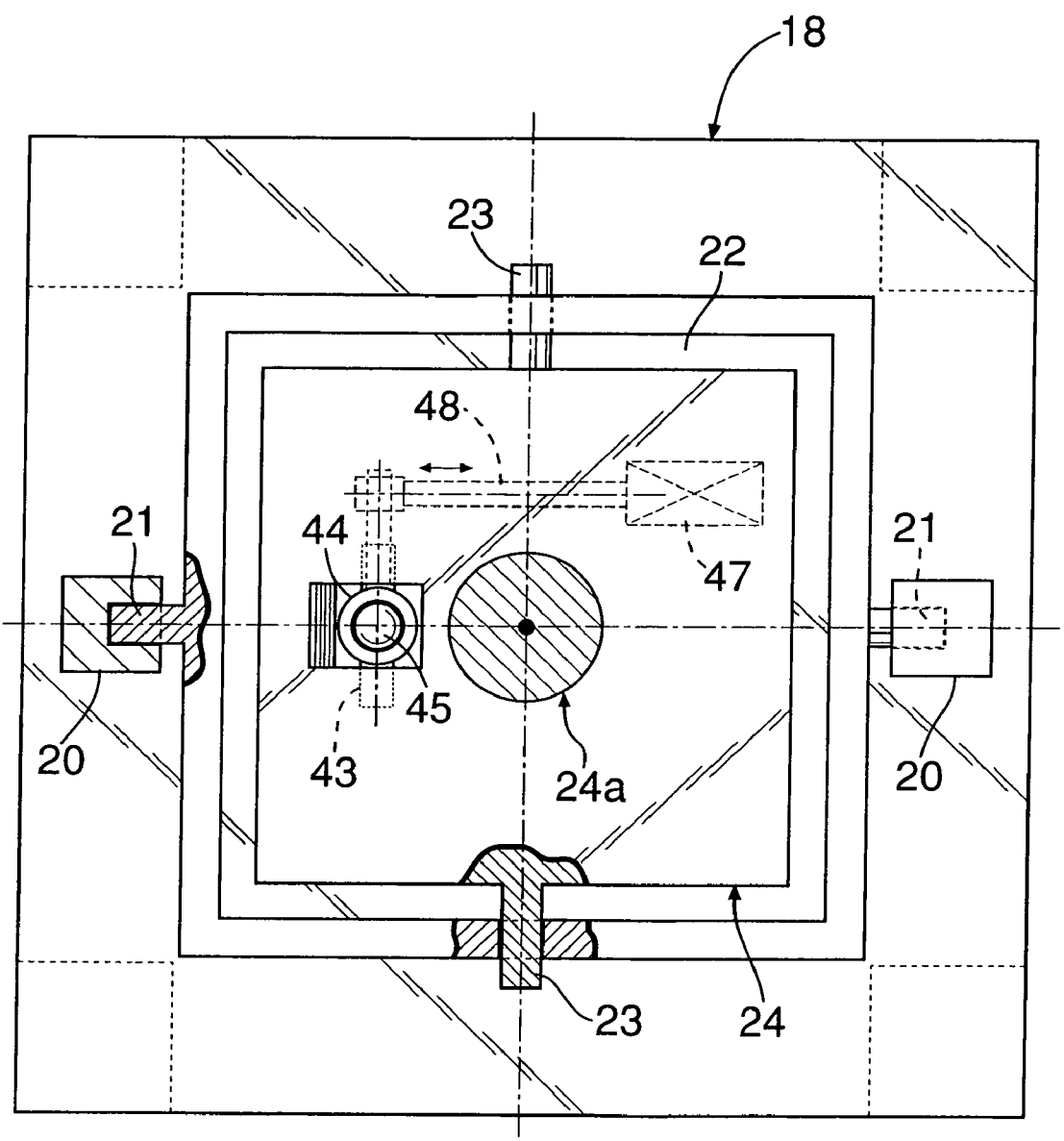
FIG. 7 is a sectional view along line 7-7 in FIG. 5 (first embodiment).
Figure 8:
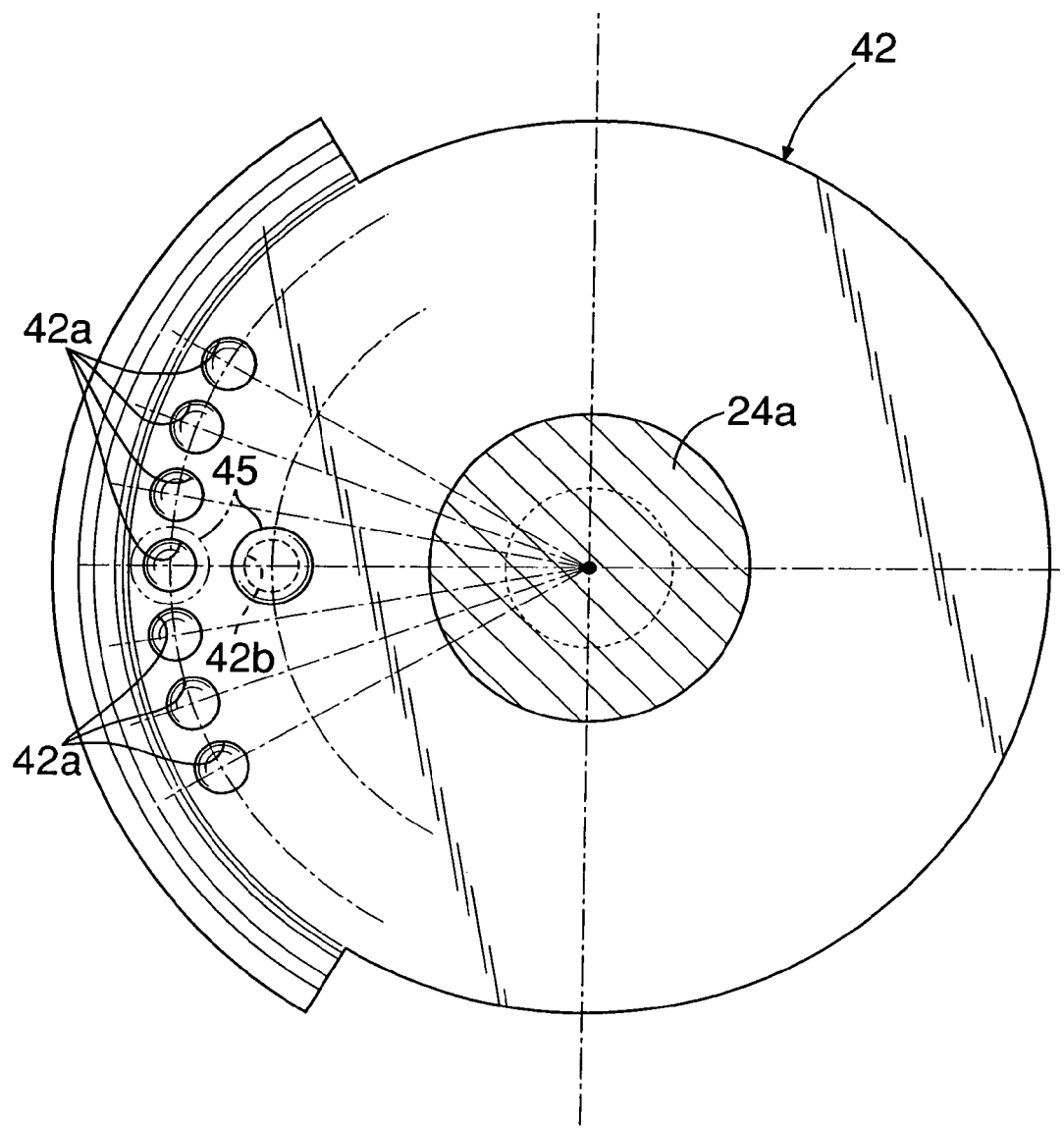
FIG. 8 is a sectional view along line 8-8 in FIG. 5 (first embodiment).

Furthermore, when the solenoid 47 is contacted by the operation of a switch (not illustrated) and the ball holder 44 swings to a position in the anticlockwise direction in FIG. 5, the position of the ball 45 moves radially outward, and the ball 45 accordingly fits into any of the seven click holes 42*a*, which are present on the radially outer side of the click plate 42, thus stably holding the operating knob 30 in seven positions in the pivoting direction. When the operating knob 30 is rotated in a left or right direction, since a load occurs as the ball 45 is detached from the click hole 42*a* against the resilient force of the spring 46, restraint can be given to pivoting of the operating knob 30.

In this way, when the operating knob 30 pivots, the rotary encoder 49 outputs a signal corresponding to the pivot position to a control device. Positional limits of the pivoting angle of the operating knob 30 are 25° for each of left and right relative to the neutral position, and when the operating knob 30 is released from the hand after being operated it is automatically returned to the neutral position by return means (not illustrated). Since the range through which the operating knob 30 can pivot is limited to 25° for each of left and right relative to the neutral position, an occupant can operate the operating knob 30 without changing grip, thus improving the operability.

When the occupant grips the operating knob 30, the palm is supported on the palm rest portion 30a of the operating knob 30, and the middle finger and the index finger are supported on the finger rest portion 30b, which is in front of the palm rest portion 30a. Since, in this state, the tips of the middle finger and the index finger abut against the main switch 31, a rotation operation of the scroll switch 33 and a pushing down operation of the execution switch 34 can be carried out smoothly, and a pushing down operation of the left and right sub switches 32 and 32 can be carried out smoothly by the thumb and the third finger.

As is clear from FIG. 5, a recess 17b for ensuring that there is a space around the opening 17a of the cover 17 is formed so that, when the operating knob 30 is gripped and tilted, a finger tip is not caught between the lower end of the operating knob 30 and the cover 17. When the vertical height of the operating knob 30 is L1, and the height between the lower end of the operating knob 30 and the deepest part of the recess 17b is L2, L1>L2 holds. It is thus possible to prevent the operating knob 30 from greatly projecting from the cover 17 and prevent it from interfering with operation of the shift lever 14.

Furthermore, when the fore-and-aft length of the operating knob 30, including the main switch 31, is L3, and the fore-and-aft length of the finger rest portion 30b (=diameter of main switch 31) is L4, the right-hand end part of L4 in FIG. 5 being, for example, although not shown, the branching point of the index finger and the middle finger as a reference point, the relationship L3>2×L4 between L3 and L4 holds. As a result, not only can the palm be supported stably by ensuring that the dimensions of the palm rest portion 30a of the operating knob 30 are sufficient, but it is also possible to operate the main switch 31 (in particular, the scroll switch 34) smoothly.

As described above, since the main switch 31 and the sub switches 32 and 32 are provided on the operating knob 30, which outputs a signal by tilting in the eight directions and pivoting around its own axis within the range of 25° to each of the left and right, it is possible to output a large number of commands by a combination of a signal due to the attitude (position) of the operating knob 30 and a signal due to the operation of the main switch 31 and the sub switches 32 and 32. Furthermore, since the main switch 31 and the sub switches 32 and 32 are provided on the operating knob 30, when the operating knob 30 is gripped, the fingertips naturally reach the main switch 31 and the sub switches 32 and 32, and the main switch 31 and the sub switches 32 and 32 can be operated easily without searching for their positions, thus reliably preventing the occurrence of an erroneous operation.

The functions of the interface device 15 are now explained.

The interface device 15 controls a plurality of systems such as a navigation system, an audio system, and an air conditioning system through a monitor screen by a combination of operations of the operating knob 30, the main switch 31, and the sub switches 32 and 32.

In the main switch 31, a menu screen is called from an initial screen by pushing down the execution switch 34, and a decision is made by selecting an item by rotation of the scroll switch 33 and pushing down the execution switch 34. The sub switches 32 and 32 sequentially switch between menu screens; when shifted to a lower level screen, they function as a cancel switch, and when shifted through multiple stages of lower level screens, they function as a cancel switch for returning directly to the menu screen by a long push.

Figure 12:
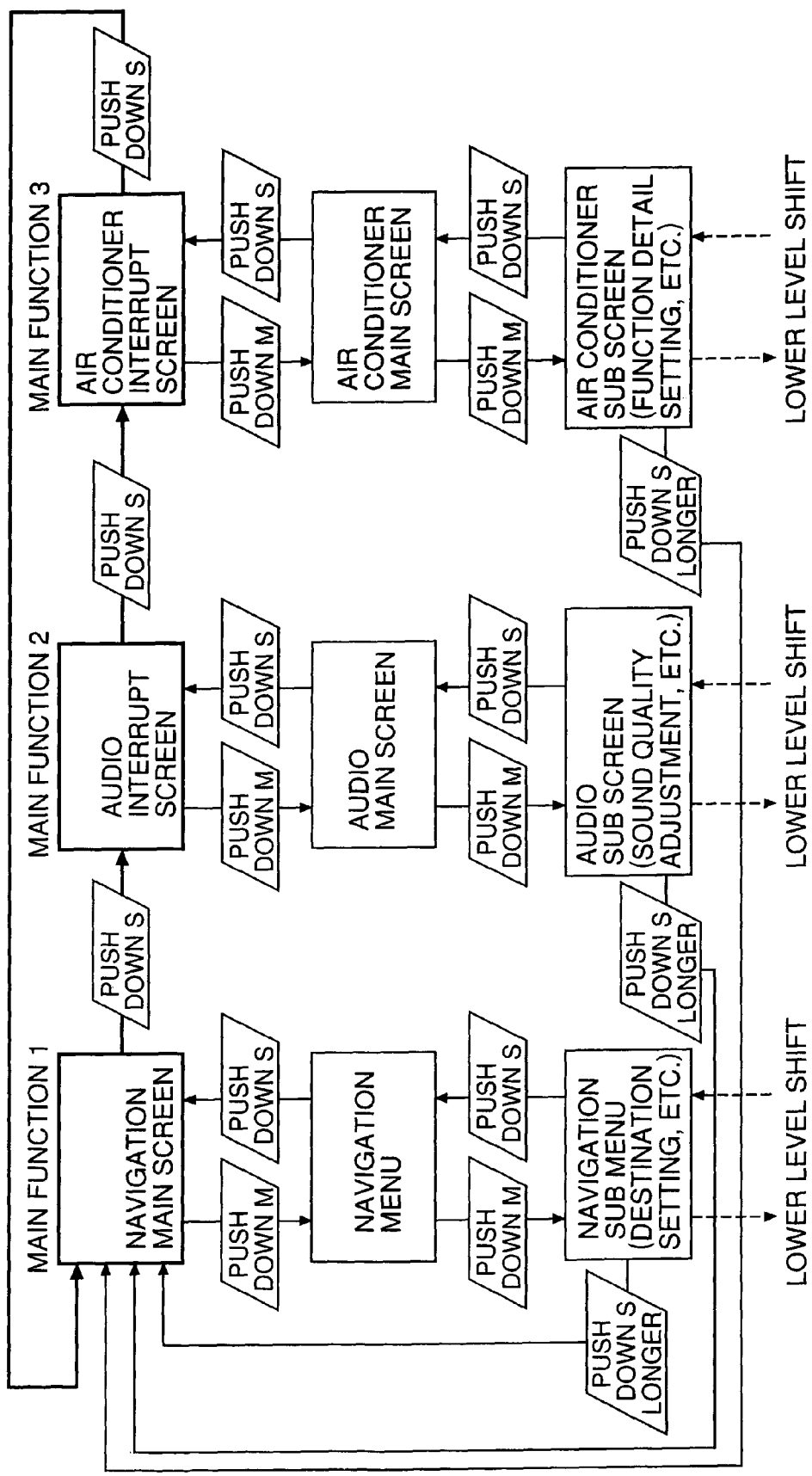
FIG. 12 is a diagram for explaining the functions of a main switch and a sub switch (first embodiment).
Figure 13:
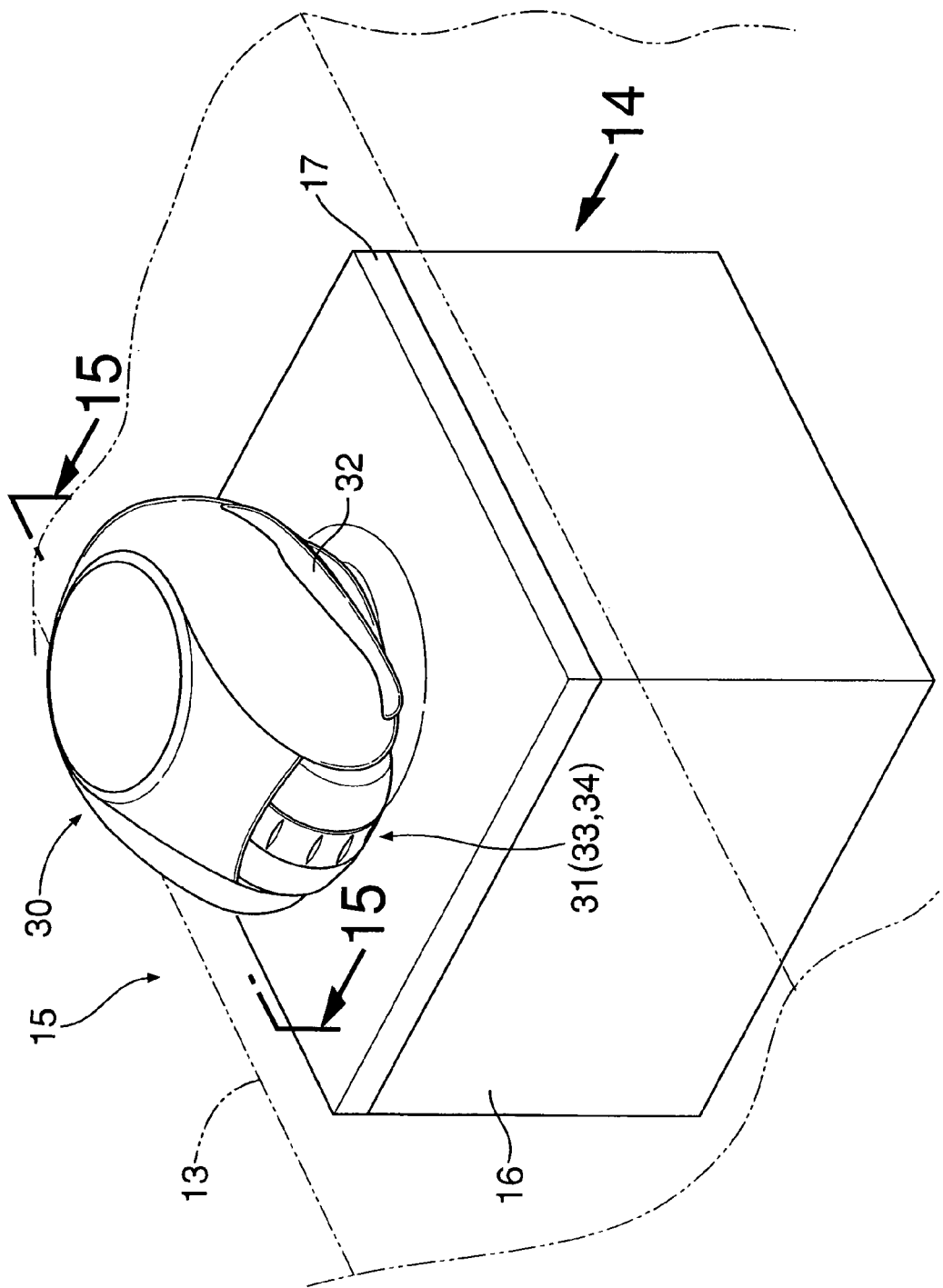
FIG. 13 is a view, corresponding to FIG. 2, of a second embodiment (second embodiment).
Figure 14:
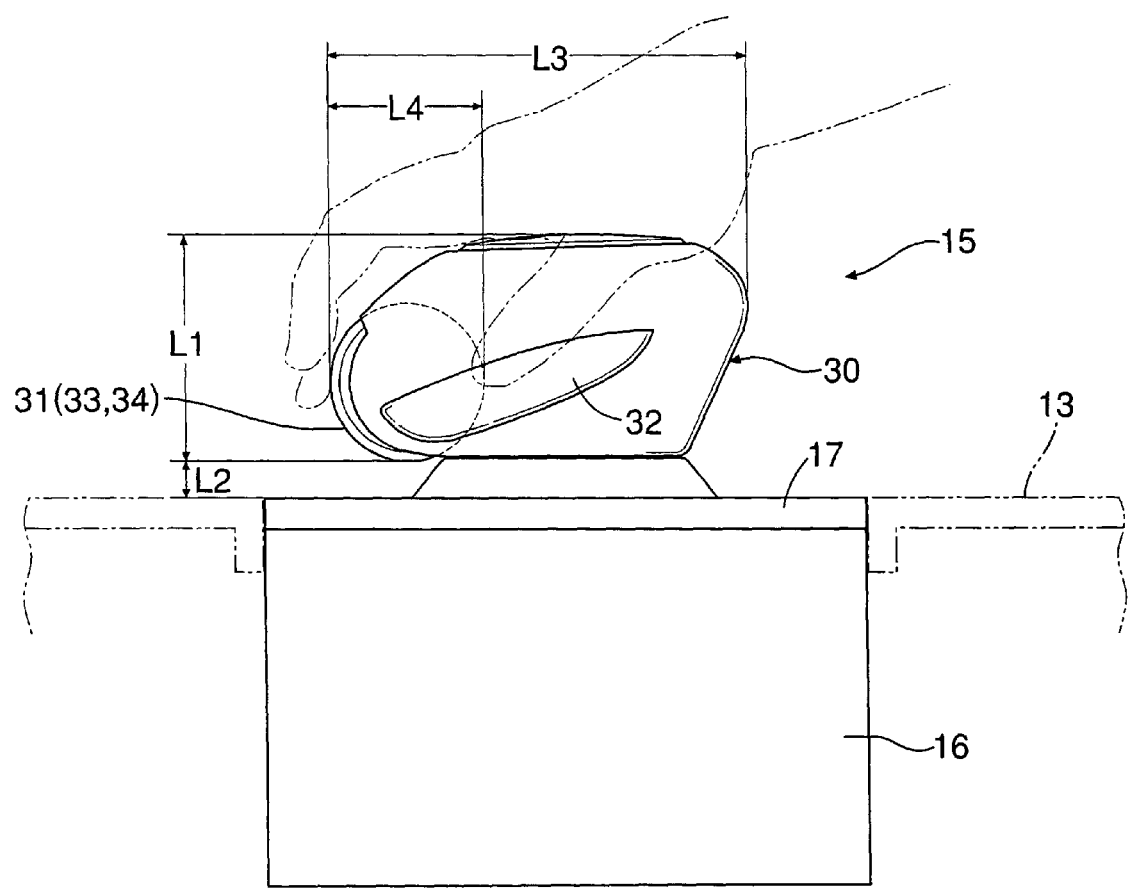
FIG. 14 is a view from the direction of arrow 14 in FIG. 13 (second embodiment).
Figure 15:
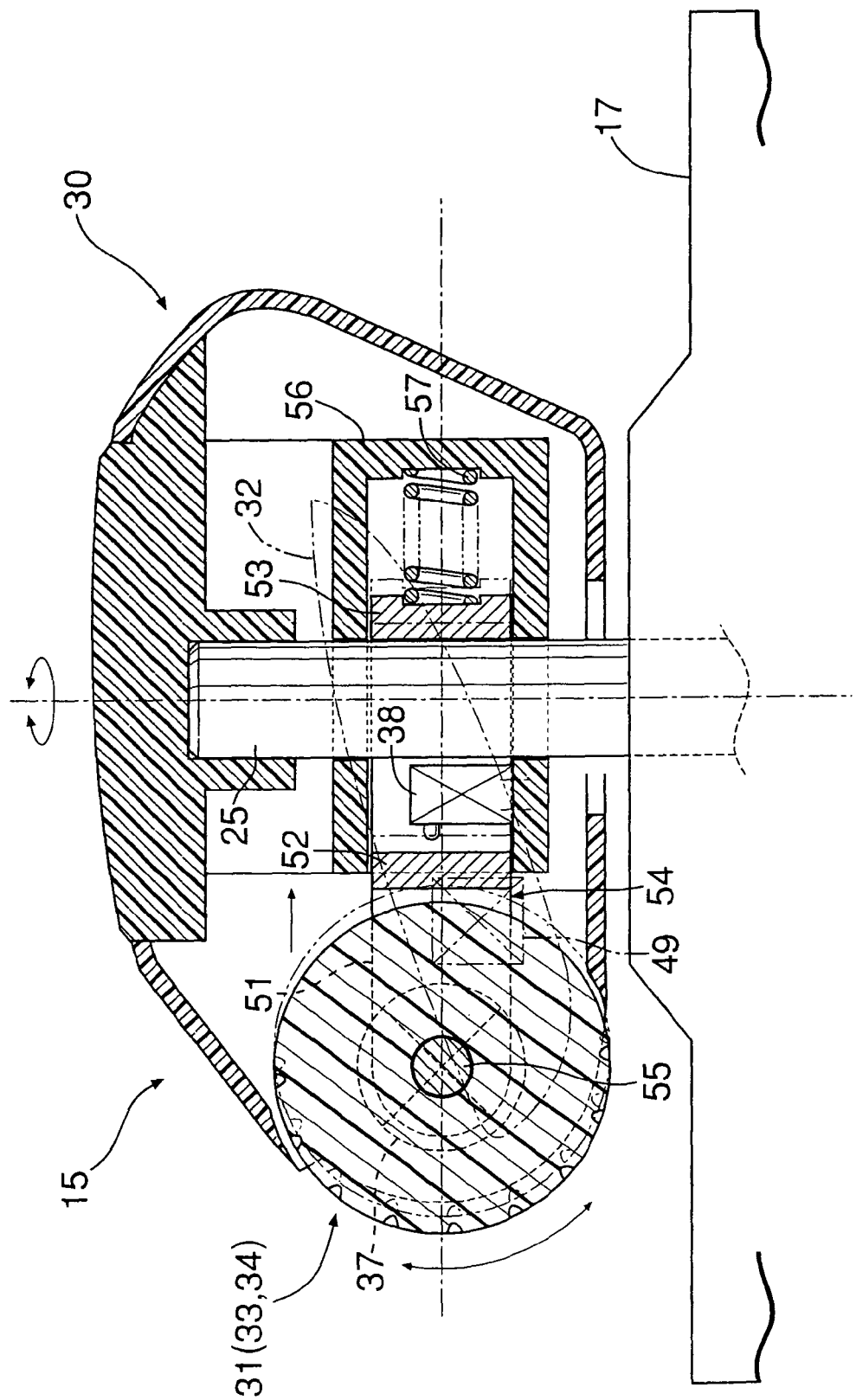
FIG. 15 is a sectional view along line 15-15 in FIG. 13 (second embodiment).
Figure 16:
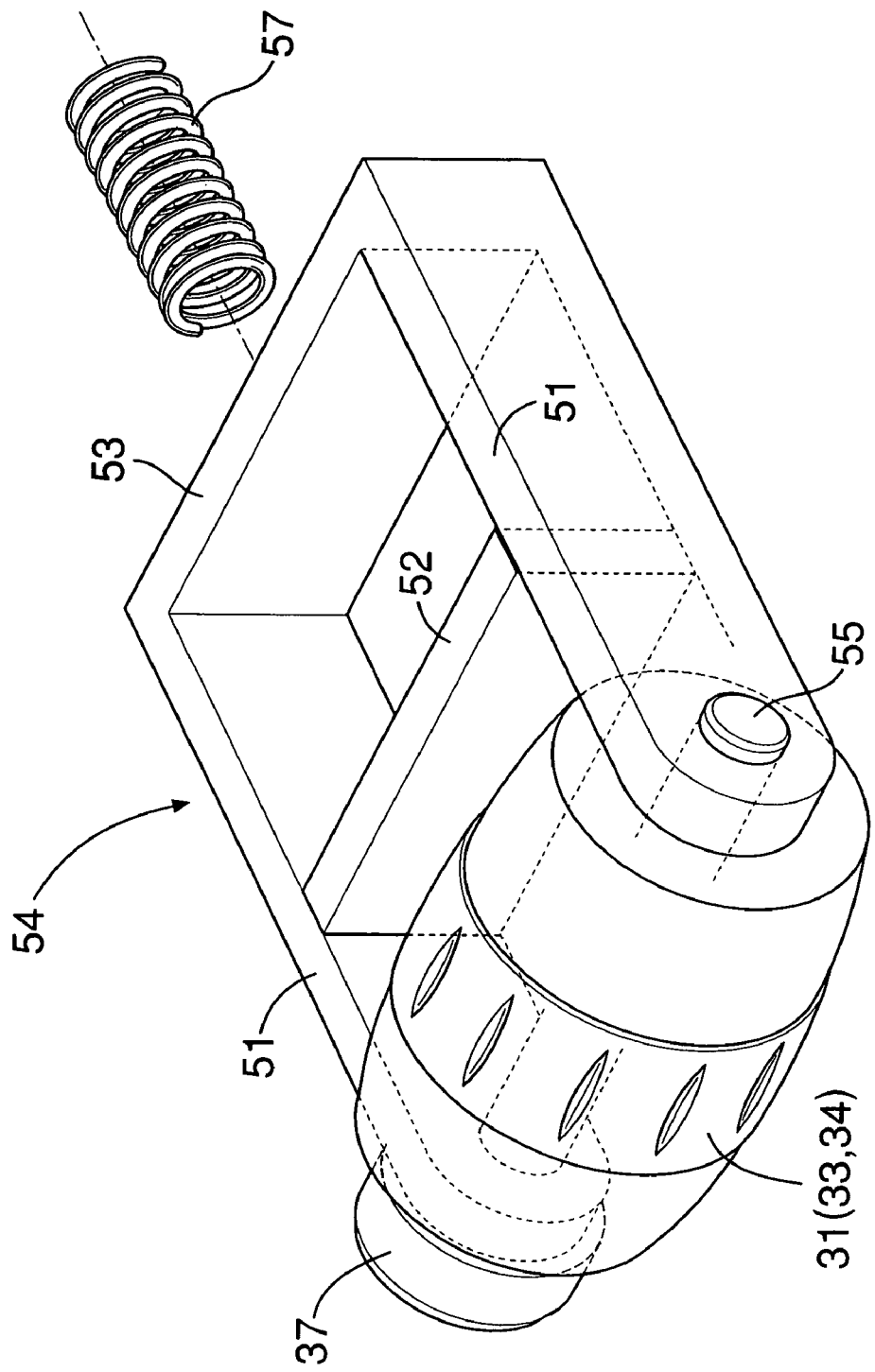
FIG. 16 is a perspective view of a main switch and a sliding member (second embodiment).

To explain in more detail, as shown in FIG. 12, when the main switch 31 (execution switch 34) is pushed down on the initial screen of the monitor, the uppermost level screen (navigation main screen) of the navigation system is displayed, and when the sub switches 32 and 32 are pushed down, uppermost level screen of navigation system→uppermost level screen (audio interrupt screen) of audio system→uppermost level screen (air conditioner interrupt screen) of air conditioning system are displayed in sequence.

Furthermore, when the main switch 31 is pushed down on the uppermost level screen (navigation main screen) of the navigation system, a second level screen (navigation menu screen) of the navigation system is displayed, and when the main switch 31 is pushed down again, a third level screen (navigation sub menu screen) of the navigation system is displayed.

Moreover, when the main switch 31 is pushed down on the uppermost level screen (audio interrupt screen) of the audio system, a second level screen (audio main screen) of the audio system is displayed, and when the main switch 31 is pushed down again, a third level screen (audio sub screen) of the audio system is displayed.

Furthermore, when the main switch 31 is pushed down on the uppermost level screen (air conditioner interrupt screen) of the air conditioning system, a second level screen (air conditioner main screen) of the air conditioning system is displayed, and when the main switch 31 is pushed down again, a third level screen (air conditioner sub screen) of the air conditioning system is displayed.

If, on the other hand, instead of the main switch 31, the sub switches 32 and 32 are pushed down, a lower level screen is switched to an upper level screen each time, and the uppermost level screen is finally returned to. Furthermore, when the sub switches 32 and 32 are pushed down for a longer time (at least 2 sec), the uppermost level screen is returned to directly from a lower level screen. In this way, since two types of function are exhibited depending on the duration for which the sub switches 32 and 32 are pushed down, it is possible to suppress an increase in the number of switches, thus enhancing the operability.

Moreover, by operating the main switch 31 and the sub switches 32 and 32 at the same time, the following various functions may be exhibited without increasing the number of switches unnecessarily.

When pushing down of the main switch 31 (execution switch 34) and pushing down of the sub switches 32 and 32 are carried out at the same time:

Example 1: single function allocation

In each screen operation, a particularly often used function is freely assigned.

In a map screen, a subject vehicle position-up display and a north-up display are switched over.

Example 2: menu calling

A menu other than a normal menu is called.

In a map function screen, a freely customizable menu is called.

In an audio screen, a function setting screen is called.

When rotation of the main switch 31 (scroll switch 33) and pushing down of the sub switches 32 and 32 are carried out at the same time:

Example 1: shortcut allocation

A specific single function, low in a hierarchy, requiring a selection operation is called directly.

In any screen, a telephone directory (requiring a selection operation) is called directly.

Example 2: analogue quantitative operation

In each screen operation, a particularly often used function is freely assigned.

In a map screen, angle adjustment is carried out, and in an air conditioner screen, air flow adjustment, etc. is carried out.

Furthermore, a tilting operation of the operating knob 30 in the eight directions is utilized for scrolling of the navigation screen in a given direction, changing a source in the audio screen, or switching functions in the air conditioner screen, and a pivoting operation of the operating knob 30 is utilized for sound volume adjustment in the navigation screen or the audio screen, temperature adjustment or air flow adjustment in the air conditioner screen, etc.

EMBODIMENT 2

FIG. 13 to FIG. 16 show a second embodiment of the present invention. In the second embodiment, members corresponding to the members of the first embodiment are denoted by the same reference numerals and symbols as those of the first embodiment, and duplication of the explanation is thus avoided.

The operating knob 30 of the first embodiment is substantially spherical, but an operating knob 30 of the second embodiment has a vertically flattened shape. The dimension of the operating knob 30 in the fore-and-aft direction is 80 mm as in the first embodiment. When the vertical height of the operating knob 30 is L1, and the height between the lower end of the operating knob 30 and an upper face of a cover 17 is L2, L1>L2 holds. Furthermore, when the fore-and-aft length of the operating knob 30, including a main switch 31, is L3, and the fore-and-aft length of a finger rest portion 30b is L4, the right-hand end part of L4 in FIG. 14 being, for example, although not shown, the branching point of the index finger and the middle finger as a reference point, the relationship L3>2×L4 between L3 and L4 holds. The relationships between these dimensions L1 to L4 are the same as in the first embodiment.

The second embodiment is different from the first embodiment in terms of the shape of the operating knob 30 as well as in terms of the structure of the main switch 31. With regard to the main switch 31 of the first embodiment, the scroll switch 33 rotates in place, and the execution switch 34 is pushed down separately from the scroll switch 33, but with regard to the main switch 31 of the second embodiment, a scroll switch 33 and an execution switch 34 rotate integrally and are pushed down integrally.

That is, the second embodiment includes a sliding member 54 in which a pair of side members 51 and 51 are connected by a front cross member 52 and a rear cross member 53, the main switch 31 is rotatably supported between the side members 51 and 51 at the front end of the sliding member 54 by a support shaft 55, and rotation of the support shaft 55 is detected by a rotary encoder 49. The sliding member 54 is supported so that it can slide in the fore-and-aft direction on a slide guide 56 formed within the operating knob 30, a spring 57 urging the sliding member 54 forward is disposed between the rear cross member 53 of the sliding member 54 and the rear end of the slide guide 56, and a switching element 38 is provided on the slide guide 56 so as to face a rear face of the front cross member 52. Other than the above, the structure of the second embodiment is the same as that of the first embodiment.

When the main switch 31 is rotated, its rotational angle is detected by the rotary encoder 49; pushing down the main switch 31 moves the sliding member 54 back along the slide guide 56, the front cross member 52 pushes the switching element 38, and the pushing down of the main switch 31 is detected.

In accordance with this second embodiment, the same effects as those of the first embodiment described above can be attained.

Embodiments of the present invention are explained above, but the present invention may be modified in a variety of ways as long as the modifications do not depart from the sprit and scope of the present invention.

For example, the tilt direction of the operating knob 30 is not limited to the eight directions of the embodiment, and the range in which the operating knob 30 can pivot is not limited to 25° to each of the left and right as in the embodiment.

The invention claimed is:

1. An operation device for a vehicle comprising:
a monitor for displaying information related to in-vehicle equipment installed in the vehicle, and
an operating knob for outputting an operation command signal to the in-vehicle equipment based on information displayed on the monitor,
wherein the operating knob is formed to have different operating loads at different operating positions, and
switching over of a plurality of operation menu display screens and switching over of a plurality of function display screens for the in-vehicle equipment displayed on the monitor are carried out by tilting of the operating knob in a plurality of directions, pivoting of the operating knob around an axis thereof in a predetermined angle range, and operation of a main switch provided on a front part of the operating knob,
wherein the operating knob comprises a first variable load mechanism for giving a restraining feel to operation by changing an operating load according to a tilt angle of the operating knob,
the first variable load mechanism having a sliding member having an end which engages with multiple guide grooves formed on an inner surface of a hemispherical-shaped recess of a base member, the sliding member for guiding the operating knob in a proper tilt direction, and
wherein said first variable load mechanism is configured to make said operating load, which is produced in tilting the operating knob, variable in response to a change in relative position of the sliding member with respect to the guide grooves.

2. The operation device for a vehicle according to claim 1, wherein a display screen displayed on the monitor is returned to a higher level display screen by operation of sub switches provided on opposite side parts on the left and right of the operating knob.

3. The operation device for a vehicle according to claim 2, wherein the operating knob comprises a second variable load mechanism for giving a restraining feel to operation by changing an operating load according to a pivot angle of the operating knob.

4. The operation device for a vehicle according to claim 1, wherein the operating knob is held at a neutral position in the tilt direction when the operating knob is not in operation.

5. The operation device for a vehicle according to claim 1, wherein the guide grooves in the hemispherical-shaped recess enable the operating knob to tilt in only eight different directions.

6. The operation device for a vehicle according to claim 1, wherein the operating knob comprises a second variable load mechanism which is located above and apart from the first variable load mechanism for giving a restraining feel to operation by changing an operating load according to a pivot angle of the operating knob.

7. The operation device for a vehicle according to claim 6, wherein the second variable load mechanism has click stop means for stopping the operating knob at a plurality of positions in a pivoting direction.

8. The operation device for a vehicle according to claim 1, wherein said end of the sliding member is hemispherical-shaped and resiliently urged toward the multiple guide grooves by a spring interposed between the sliding member and the operating knob and said guide grooves extend radially in multiple directions and each of the guide groove is tapered from radially inside to outside.

9. An operation device for a vehicle comprising:
a monitor for displaying information related to in-vehicle equipment installed in the vehicle, and
an operating knob for outputting an operation command signal to the in-vehicle equipment based on information displayed on the monitor,
wherein the operating knob comprises:
a first variable load mechanism for giving a restraining feel to operation by changing an operating load according to a tilt angle of the operating knob, and
a second variable load mechanism for giving a restraining feel to operation by changing an operating load according to a pivot angle of the operating knob, and
switching over of a plurality of operation menu display screens and switching over of a plurality of function display screens for the in-vehicle equipment displayed on the monitor are carried out by tilting of the operating knob in a plurality of directions, pivoting of the operating knob around an axis thereof in a predetermined angle range, and operation of a main switch provided on a front part of the operating knob,
wherein the operating knob is supported on a base plate via a plate-shaped member which is integral with a rotary shaft of the operating knob so that the operating knob can swing in fore-and-aft and left-and-right directions,
wherein the plate-shaped member is provided with a part of components of each of the first variable load mechanism and the second variable load mechanism, and
wherein the plate-shaped member includes a lower support shaft which projects downwardly from a lower surface thereof and extends part way into a hemispherical-shaped recess of a base member located below the plate-shaped member.
wherein the lower support shaft has a hollow bore for housing a sliding member, the sliding member being one of the components of the first variable load mechanism, and
wherein said first variable load mechanism is configured to make said operating load, which is produced in tilting the operating knob, variable in response to a change in relative position of the sliding member with respect to the hemispherical-shaped recess of the base member.

10. The operation device for a vehicle according to claim 9, wherein a display screen displayed on the monitor is returned to a higher level display screen by operation of sub switches provided on opposite side parts on the left and right of the operating knob.

11. The operation device for a vehicle according to claim 9, wherein the operating knob is held at a neutral position in the tilt direction when the operating knob is not in operation.

12. The operation device for a vehicle according to claim 9, wherein the first variable load mechanism of the operating knob has guide means for guiding the operating knob in a proper tilt direction,
the sliding member is formed with a hemispherical-shaped sliding portion which engages with the guide means for guiding the operating knob in the proper tilt direction,
hemispherical-shaped sliding portion having a diameter larger than that of the hollow bore of the lower support shaft.

13. The operation device for a vehicle according to claim 12, wherein the guide means is formed in the hemispherical-shaped recess formed in the base member is located under the plate-shaped member, and
the guide means enables the operating knob to tilt in only eight different directions.

14. The operation device for a vehicle according to claim 9, wherein the second variable load mechanism has click stop means for stopping the operating knob at a plurality of positions in a pivoting direction.

15. The operation device for a vehicle according to claim 9, wherein said sliding member has an end which is hemispherical-shaped and resiliently urged toward the hemispherical-shaped recess of the base member by a spring interposed between the sliding member and the operating knob in said hollow bore.

* * * * *